United States Patent [19]

Kaneko

[11] Patent Number: 4,852,702
[45] Date of Patent: Aug. 1, 1989

[54] AUTOMATIC ADJUSTER FOR OPERATION GAP OF BRAKE

[75] Inventor: Kiyokazu Kaneko, Saitama, Japan
[73] Assignee: Akebono Brake Industry Co., Ltd., Tokyo, Japan
[21] Appl. No.: 193,039
[22] Filed: May 12, 1988

[30] Foreign Application Priority Data

May 14, 1987 [JP] Japan ................... 62-115888

[51] Int. Cl.⁴ ............................................. F16D 65/56
[52] U.S. Cl. ............................. 188/196 D; 188/79.62; 188/196 V; 188/196 M
[58] Field of Search ....... 188/196 D, 196 BA, 196 V, 188/202, 199, 196 C, 196 M, 196 P, 71.8, 71.9, 72.3, 79.51, 79.54, 79.56, 79.57, 79.58, 79.59, 79.61, 79.62, 79.63, 79.64, 364; 192/11 A, 70.25; 92/13–13.8

[56] References Cited

U.S. PATENT DOCUMENTS

| | | | |
|---|---|---|---|
| Re. 28,881 | 6/1976 | Farr | 188/196 D |
| 3,774,733 | 11/1973 | Farr | 188/79.62 X |
| 3,797,613 | 3/1974 | Nehr | 188/79.62 |
| 3,809,189 | 5/1974 | Farr | 188/71.9 |
| 3,811,538 | 5/1974 | Farr | 188/79.62 |
| 3,878,923 | 4/1975 | Farr | 188/71.9 X |
| 3,999,638 | 12/1976 | Margetts | 188/196 D |
| 4,022,300 | 5/1977 | Afanador et al. | 188/71.9 X |
| 4,270,634 | 6/1981 | Matsuzaki | 188/79.62 X |
| 4,369,863 | 1/1983 | Farr et al. | 188/196 D X |
| 4,416,356 | 11/1983 | Osborne | 188/364 X |
| 4,530,424 | 7/1985 | Fukuzawa et al. | 188/196 D |
| 4,688,661 | 8/1987 | Gockel et al. | 192/111 A X |

FOREIGN PATENT DOCUMENTS 0050945 5/1982 European Pat. Off. ......... 188/79.62
47-12974 4/1972 Japan .

Primary Examiner—Douglas C. Butler
Attorney, Agent, or Firm—Cushman, Darby & Cushman

[57] ABSTRACT

An automatic adjuster for the operation gap of a brake, comprising a piston slidably fitted in a cylinder, an adjusting nut supported in contact with the outer end of the piston the adjusting nut being rotatable relative to the piston, an unrotatable adjusting screw supporting a brake friction member at the outer end of the screw and engaged with the internal thread of the nut at the external thread to form a non-reversible screw-thread connection, the adjusting screw and the adjusting nut cannot rotate relative to each other by any force acting to the non-reversible screw-thread connection in the axial direction thereof, a drive screw connected to the cylinder through a friction clutch and engaged with the external thread of the nut at the internal thread to form a reversible screw-thread connection which has a backlash corresponding to the operation gap, the drive screw and the adjusting nut can rotate relative to each other by a force acting to the reversible screw-thread connection in the axial direction thereof, and a waved spring for elastically pushing the drive screw in the axial direction thereof to urge the engagement of the clutch.

11 Claims, 1 Drawing Sheet

FIGURE
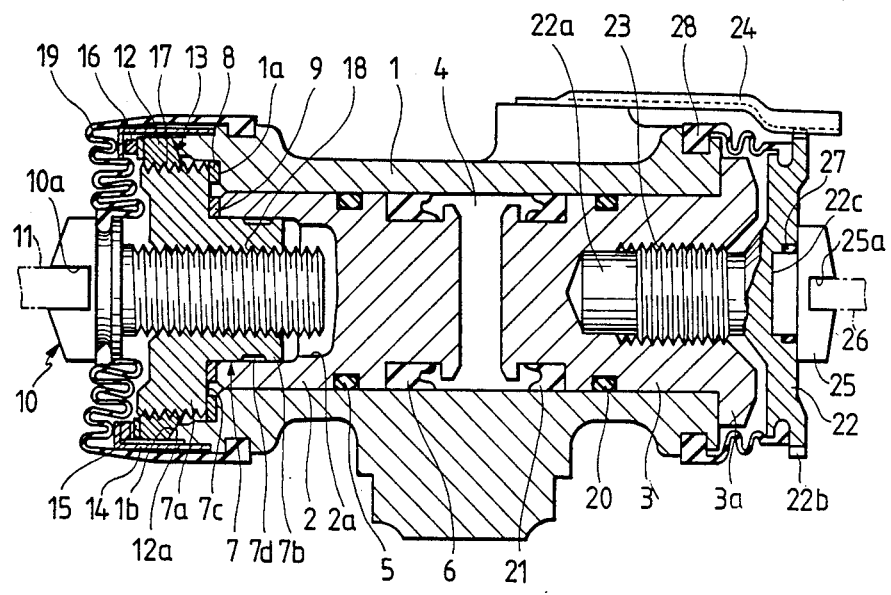

AUTOMATIC ADJUSTER FOR OPERATION GAP OF BRAKE

BACKGROUND OF THE INVENTION

The present invention relates to an automatic adjuster for the operation gap of a brake.

An automatic adjuster built in the wheel cylinder of a drum brake as disclosed in the U.S. Pat. No. 4,530,424, for examples, is known as a conventional automatic adjuster for the operation gap of a brake. Since the automatic adjuster is constituted so that at the time of the elastic deformation of a brake drum, the rise in liquid pressure over a prescribed level is utilized to prevent excessive adjustment, the constitution of the automatic adjuster is likely to be complicated and the life of a cup seal is relatively short. Besides, since the automatic adjuster is installed in a liquid pressure chamber, the efficiency of work for the installation is low.

Another conventional automatic adjuster is installed at the outer end of a wheel cylinder as disclosed in the Japanese Pat. No. 12974/72, for example. The automatic adjuster is provided with a mechanism for preventing excessive adjustment caused by the elastic deformation of a brake drum. In the automatic adjuster, an elastic member is inserted between a first and a second pistons extending in the axial direction of the adjuster and disposed coaxially with each other. The elastic member needs to have such elastic characteristics that it is scarcely deformed by the resilient force of a shoe return spring; and after a brake friction member comes into contact with the brake drum, the elastic member is compressed in the axial direction thereof but expanded in the radial direction thereof to couple a bushing and the operating piston to each other. However, the elastic member is likely to deteriorate with the lapse of time, it is difficult to maintain the elastic characteristics for a long period of time, and the life of the elastic member is relatively short.

SUMMARY OF THE INVENTION

The present invention was made in order to eliminate the above-mentioned drawbacks of the conventional automatic adjusters.

Accordingly, it is an object of the present invention to provide an automatic adjuster which is for the operation gap of a brake and comprises a piston slidably fitted in a cylinder; an adjusting nut supported in contact with the outer end of the piston so that the adjusting nut is rotatable relative to the piston; an unrotatable adjusting screw means supporting a brake friction member at the outer end of the adjusting screw means and engaged with the internal thread of the adjusting nut at the external thread to form a non-reversible screw-thread connection; the adjusting screw means and the adjusting nut cannot rotate relative to each other by any force acting to the non-reversible screw-thread connection in the axial direction thereof; a drive screw means connected to the cylinder through a friction clutch and engaged with the external thread of the adjusting nut at the internal thread to form a reversible screw-thread connection which has a backlash corresponding to the operation gap of the brake; the drive screw means and the adjusting nut can rotate relative to each other by a force acting to the reversible screw-thread connection in the axial direction thereof; and an elastic pressure means for elastically pushing the drive screw means in the axial direction thereof to urge the engagement of the friction clutch.

When a braking liquid is supplied into the cylinder, the piston moves forwardly to put the brake friction member in frictional engagement with a rotary member rotating together with a wheel, to apply a braking force thereto. If the operation gap is not larger than a prescribed amount, the adjusting nut is moved together with the piston, within the backlash of the reversible screw-thread connection, to apply the braking force to the wheel. If the operation gap is larger than the prescribed amount due to the wear of the brake friction member, the adjusting nut moves forwardly further beyond the backlash of the reversible screw-thread connection. At that time, the drive screw means slightly compresses the elastic pressure means to disengage the friction clutch to rotate it to slightly protrude the adjusting nut in the axial direction thereof.

When the braking liquid is drained out of the cylinder at the end of the braking of the wheel, the piston moves backwardly. At that time, the adjusting nut returns without rotating, together with the adjusting screw means and the piston by the prescribed amount set by the backlash of the reversible screw-thread connection. After that, the drive screw means rotates the adjusting nut engaged therewith at the reversible screw-thread connection, because the rotation of the drive screw means is restrained by the friction clutch urged by the elastic pressure means. As a result, the adjusting screw means engaged with the adjusting nut at the non-reversible screw-thread connection spirally moves outwardly relative to the adjusting nut. Thus, the operation gap is finely adjusted.

If the coefficient of friction of the friction clutch is preset at a prescribed value so that when a strong reactionary force acts to the adjusting screw means in the axial direction thereof, the rive screw means rotates relative to the adjusting nut as the adjusting screw means and the adjusting nut remain frictionally engaged with each other at the non-reversible screw-thread connection, the excessive adjustment in which the operation gap is adjusted according to the elastic deformation of the rotary member such as a brake drum can be prevented. In other words, the strong reactionary force acts to the adjusting screw means in the axial direction thereof due to the contact of the brake friction member with the rotary member at the time of the elastic deformation of the rotary member. In such a case, the friction clutch is caused to slip so as to rotate the drive screw means relative to the adjusting nut to prevent the excessive adjustment.

The efficiency of work for the assembly of the automatic adjuster whose major parts are installed at the outer end of the cylinder is high. The performance of sealing on the piston against the braking liquid is not likely to deteriorate. The life of the automatic adjuster is long. Since the elastic pressure means only acts to urge the engagement of the friction clutch with the drive screw means, the elastic pressure means is unlikely to deteriorate with the lapse of time so as to act improperly. Therefore, the reliability of the elastic pressure means is high. Besides, the excessive adjustment can be easily prevented.

BRIEF DESCRIPTION OF THE DRAWING

The drawing attached hereto shows a sectional view of a automatic adjuster which is for the operation gap of a brake and is an embodiment of the present invention.

DETAILED DESCRIPTION OF PREFERRED EMBODIMENT

An embodiment of the present invention is hereafter described in detail with reference to the drawing.

The drawing shows an automatic adjuster which is the embodiment of the invention and applied to the wheel cylinder 1 of a two-leading type drum brake. A pair of pistons 2 and 3 are fitted in the wheel cylinder 1 so that the pistons can move away from each other and a liquid pressure chamber 4 is defined between both the pistons. The piston 2 is slidably fitted in the wheel cylinder 1. An O-ring 5, which acts to frictionally prevent the rotation of the piston 2, and a cup seal 6, which acts to prevent a braking liquid from leaking, are interposed between the piston and the wheel cylinder 1. The piston 2 has a recess 2a at the outer end thereof.

An adjusting nut 7 has a large-sideout-diameter portion 7a at the outer end thereof and a small-sideout-diameter portion 7b at the inner end thereof. When the adjusting nut 7 moves backwardly in the original position thereof as shown in the drawing, the outer peripheral portion of the annular step 7c of the adjusting nut is in contact with an annular washer 8 on the step 1a of the wheel cylinder 1, the inner circumferential portion of the annular step 7c is in contact with a low-friction annular plate 9 on the outer end of the piston 2 so as to be rotatable relative thereto, and the small-sideout-diameter portion 7b of the adjusting nut is in the recess 2a of the piston so as to be rotatable relative thereto. The small-sideout-diameter portion 7b of the adjusting nut 7 has an annular groove 7d which functions as a grease reservoir.

An adjusting screw means 10 engages with the internal thread of the adjusting nut 7 at the external thread to form a non-reversible screw-thread connection 18 which couple the adjusting screw means and the adjusting nut to each other. The adjusting screw means 10 and the adjusting nut 7 cannot rotate relative to each other by any force acting to the non-reversible screw-thread connection in the axial direction thereof. The threads of the non-reversible screw-thread connection 18 are conventional single screw-threads. A brake shoe 11, which is a brake friction member, is fitted in the bifurcated portion 10a of the adjusting screw means 10 at the outer end thereof to restrain the rotation of the adjusting screw means.

The inner peripheral surface of an annular drive screw means 12 is engaged with the external thread of the large-sideout-diameter portion 7a of the adjusting nut 7 at the internal thread to form a reversible screw-thread connection 17 which has a backlash corresponding to the operation gap of the brake and couple the drive screw means and the adjusting nut to each other. The drive screw means 12 and the adjusting nut 7 can rotate relative to each other by a force acting to the reversible screw-thread connection 17 in the axial direction thereof. The threads of the reversible screw-thread connection 17 are conventional multiple screw-threads. The inner end of the drive screw means 12 is a conical surface 12a. One end of the wheel cylinder 1 is a conical surface 1b corresponding to the conical surface 12a of the drive screw means 12. A friction clutch 13 is composed of the conical surfaces 12a and 1b.

A retainer 14 is press-fitted on the outer peripheral surface of the wheel cylinder 1 at the end thereof. A waved spring 16 is provided as an elastic pressure means between the inward flange of the outer portion of the retainer 14 and the drive screw means 12. A low-friction annular plate 15 is interposed between the waved spring 16 and the drive screw means 12 to prevent the rotation of the drive screw means from being hindered. The waved spring 16 elastically pushes the drive screw means 12 in the axial direction thereof to urge the frictional engagement of the friction clutch 13.

The coefficient of friction of the friction clutch 13 is preset so that when the operation gap of the brake is excessively large, the frictional engagement of the clutch is ceased, as the adjusting nut 7 moves forwardly together with the piston 2, to rotate the drive screw means 12 through the action of the reversible screw-thread connection 17; and when the operation gap of the brake is likewise excessively large, the frictional engagement of the friction clutch is caused again, as the adjusting nut moves backwardly, to restrain the rotation of the drive screw means and rotate the adjusting nut through the action of the reversible screw-thread connection 17 and that of the low-friction plate 9. If the automatic adjuster is constituted so that excessive adjustment due to the elastic deformation of a brake drum (not shown in the drawing) which is a rotary member to rotate together with a wheel is prevented, the coefficient of friction of the friction clutch 13 is preset so that the drive screw means 12 rotates relative to the adjusting nut 7 as a strong reactionary force acts to the adjusting screw means 10 in the axial direction thereof due to the contact of the brake shoe 11 and the brake drum. In that case, the adjusting screw means 10 and the adjusting nut 7 are frictionally engaged with each other at the non-reversible screw-thread connection 18.

Shown at 19 in the drawing is a dust cover extending from the wheel cylinder 1 to the adjusting screw means 10.

The other piston 3 is slidably fitted in the wheel cylinder 1. An O-ring 20, which acts to frictionally prevent the rotation of the piston 3, and a cup seal 21, which acts to prevent the braking liquid from leaking, are interposed between the piston and the wheel cylinder 1. When the piston 3 moves backwardly in the original position thereof shown in the drawing, the inner annular surface of the flange 3a of the piston at the outer end thereof is in contact with the other end of the wheel cylinder 1.

The shaft 22a of a manually adjusting gear 22 is engaged with the piston 3 at the non-reversible screw-thread connection 23 therebetween, which couples the gear and the piston to each other. The adjusting gear 22 and the piston 3 cannot rotate relative to each other by any force acting to the non-reversible screw-thread connection 23 in the axial direction thereof. When the operation gap of the brake is to be manually adjusted, a tool engages with the teeth 22b of the gear 22 and turned so that the gear moves backwardly or forth relative to the piston 3.

Shown at 24 in the drawing is a gear stopper which is secured to the cylinder 1 and whose outer portion is elastically engaged with the teeth 22b of the manually adjusting gear 22 to prevent the gear from rotating unexpectedly.

The shaft of an engaging member 25 having a bifurcated portion 25a, in which a brake shoe 26 is engaged, is rotatably fitted in the circular hole 22c of the manually adjusting gear 22 at the outer end thereof.

Shown at 27 and 28 in the drawing are a friction ring and a dust cover, respectively.

The operation of the automatic adjuster is described in detail hereinunder.

When the braking liquid is supplied into the liquid pressure chamber 4 of the wheel cylinder 1, the pistons 2 and 3 move forwardly to put the brake shoes 11 and 26 into frictional engagement with the brake drum to apply a braking force thereto. If the operation gap of the brake is not larger than a prescribed amount, the adjusting nut 7 moves together with the piston 2, within the backlash of the reversible screw-thread connection 17, to that the braking force is applied to the brake drum. If the operation gap of the brake is larger than the prescribed amount due to the wear of the brake shoe 11, the adjusting nut 7 moves forwardly further beyond the backlash of the reversible screw-thread connection 17. At that time, the drive screw means 12 slightly compresses the waved spring 16 to disengage the friction clutch 13 to thereby rotate it to slightly protrude the adjusting nut 7 in the axial direction thereof.

When the braking liquid is drained out of the liquid pressure chamber 4 at the end of the braking of the brake drum, the pistons 2 and 3 move backwardly by a shoe return spring (not shown in the drawing). At that time, the adjusting nut 7 moves backwardly together with the adjusting screw means 10 and the piston 2, without rotating, by the prescribed amount set by the backlash of the reversible screw-thread connection 17. After that, the adjusting nut 7 coupled to the drive screw means 12 by the reversible screw-thread connection 17 rotates because the rotation of the drive screw means is restrained by the friction clutch 13 pushed by the waved spring 16. As a result, the adjusting screw means 10 coupled to the adjusting nut 7 by the non-reversible screw-thread connection 18 is spirally moved outward relative to the adjusting nut. Since the adjusting screw means 10 is lightly pushed into the adjusting nut 7 by the shoe return spring and is nearly in a neutral state, the adjusting nut is easily rotated.

Thus, the operation gap of the brake can be finely adjusted in terms of the difference between the pitch of the non-reversible screw-thread connection 18 and that of the reversible screw-thread connection 17.

If the coefficient of friction of the friction clutch 13 is preset at a prescribed value so that when the strong reactionary force acts to the adjusting screw means 10 in the axial direction thereof, the drive screw means 12 rotates relative to the adjusting nut 7 as the adjusting screw means and the adjusting nut remain frictionally engaged with each other at the non-reversible screw-thread connection 18, the excessive adjustment in which the operation gap of the brake would be adjusted depending on the elastic deformation of the brake drum can be prevented. In other words, the strong reactionary force acts to the adjusting screw means 10 in the axial direction thereof due to the contact of the brake shoe 11 and the brake drum at the time of the elastic deformation of the brake drum. In such a case, the friction clutch 13 is caused to slip so as to rotate the drive screw means 12 relative to the adjusting nut 7 to prevent the excessive adjustment.

What is claimed is:

1. An automatic adjuster for the operation gap of a brake, comprising:
    a piston slidably fitted in a cylinder, said piston being provided with a recess at the outer end thereof;
    an adjusting nut supported by the outer end of said piston, said adjusting nut being rotatable relative to said piston, said adjusting nut being provided with a small-sideout-diameter portion, a large-sideout-diameter portion and a annular step, said small-sideout-diameter portion being rotatably mounted in said recess of said piston, said annular step contacting the end of said piston and the cylinder;
    an nonrotatable adjusting screw means supporting a brake friction member at the outer end of said screw means, said screw means being engaged with the internal thread of said nut at the external thread to form a non-reversible screw-thread connection, said adjusting screw and said adjusting nut cannot rotate relative to each other by any force acting to said nonreversible screw-thread connection in the axial direction thereof;
    a drive screw means connected to said cylinder through a friction clutch and engaged with the external thread of said nut at the internal thread to form a reversible screw-thread connection which has a backlash corresponding to said operation gap, said drive screw means and said adjusting nut can rotate relative to each other by a force acting to said reversible screw-thread connection in the axial direction thereof, said drive screw being threadable mounted on said large-sideout-diameter portion of said adjusting nut; and
    an elastic pressure means for elastically pushing said drive screw means in the axial direction thereof to urge the engagement of said clutch.

2. The automatic adjuster according to claim 1, wherein the coefficient of friction of said friction clutch is preset so that when an excessive reactionary force acts to said adjusting screw means in the axial direction thereof, said drive screw means rotates relative to said adjusting nut as said adjusting screw means and said nut remain frictionally engaged with each other at said non-reversible screw-thread connection.

3. The automatic adjuster according to claim 1, wherein said friction clutch is composed of the conical surface of the end of said cylinder and the conical surface of said drive screw means.

4. The automatic adjuster according to claim 3, wherein said elastic pressure means is made of a waved spring supported by a retainer press-fitted on the outer peripheral surface of said cylinder at the outer end thereof and urges the conical surface of said drive screw means toward that of said cylinder, 5. The automatic adjuster of claim 4, further comprising a low friction plate provided between said waved spring and said drive screw means, wherein said retainer is provided with a flange extending axially inward.

6. The automatic adjuster according to claim 1, wherein a dust cover is provided between the outer peripheral surface of said cylinder and said adjusting screw means.

7. The automatic adjuster according to claim 1 wherein said adjuster is applied to a wheel cylinder of a drum brake.

8. The automatic adjuster according to claim 7, wherein said wheel cylinder is provided with a pair of pistons; said adjuster is built in one of said pistons; and a manually adjusting gear is engaged with the other piston to form a non-reversible screw-thread connection therebetween.

9. The automatic adjuster according to claim 1, further comprising an O-ring frictionally engaged with said cylinder said O-ring preventing said piston from rotating unexpectedly.

10. The automatic adjuster of claim 1, further comprising a washer provided between said cylinder an said annular step of said adjusting nut.

11. The automatic adjuster of claim 1, further including a low-friction plate provided between the outer end of said piston and said annular step of said adjusting nut.

* * * * *